UNITED STATES PATENT OFFICE.

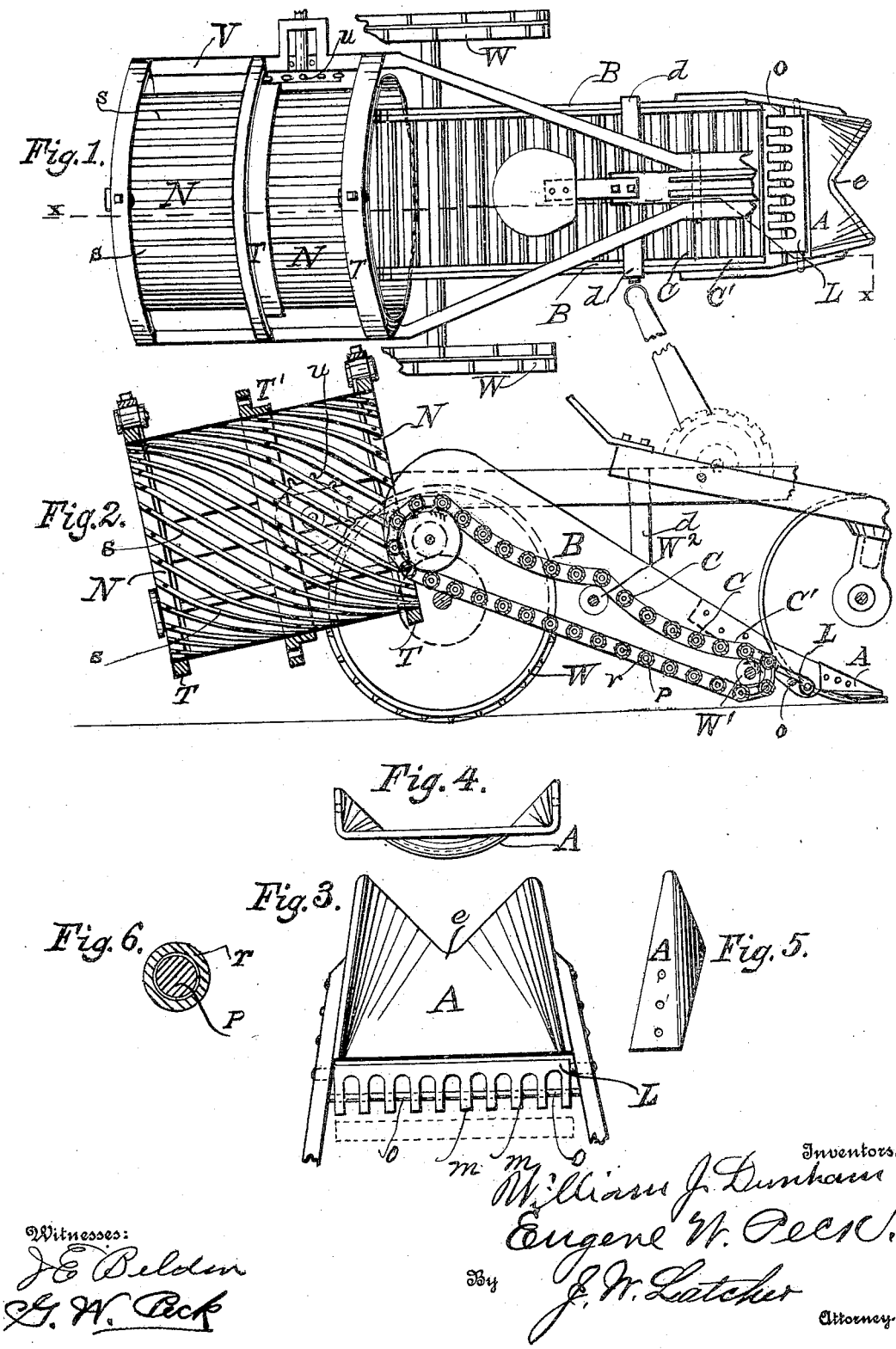

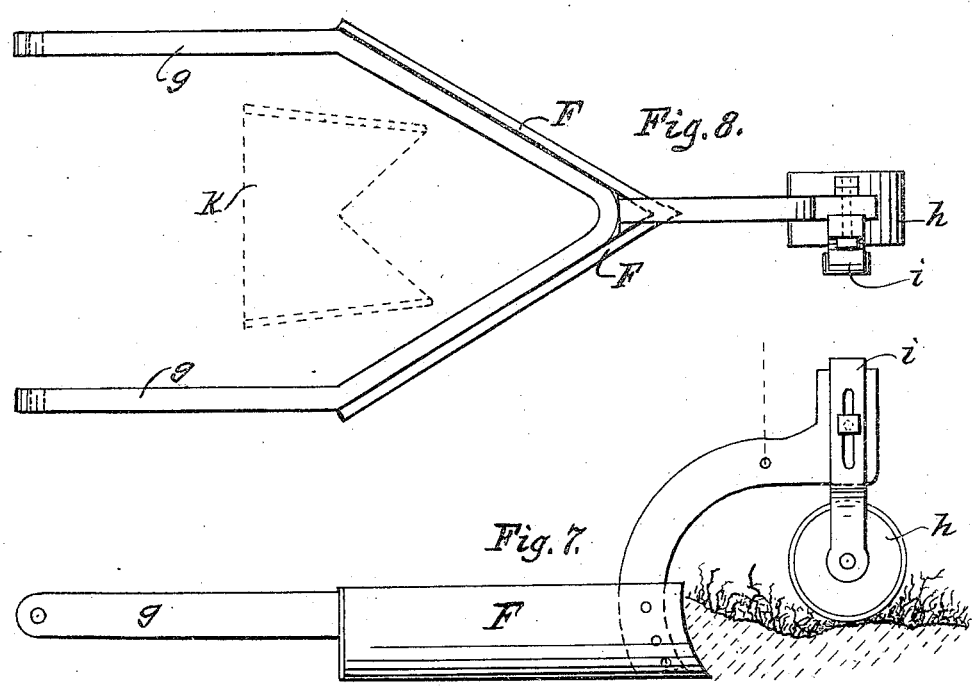

WILLIAM J. DUNHAM AND EUGENE W. PECK, OF GLOVERSVILLE, NEW YORK.

APPARATUS FOR HARVESTING POTATOES, ONIONS, &c.

942,626. Specification of Letters Patent. Patented Dec. 7, 1909.

Application filed December 3, 1908. Serial No. 465,846.

*To all whom it may concern:*

Be it known that we, WILLIAM J. DUNHAM and EUGENE W. PECK, citizens of the United States, residing at Gloversville, in the county of Fulton and State of New York, have invented certain new and useful Improvements in Apparatus for Harvesting Potatoes, Onions, and other Vegetables; and we do hereby declare the following to be a full, clear, and exact description of the invention, such as will enable others skilled in the art to which it appertains to make and use the same.

Our invention relates to improvements in apparatus for harvesting potatoes, onions and other vegetables.

The object of our invention is to thoroughly separate sand and earth from the potatoes and deposit the latter in rows behind the machine by combining a revolving meshed or barred screen immediately behind the elevator ordinarily employed. The said revolving screen is inclined downward and rearward from the elevating mechanism so that the potatoes and soil will become separated in their passage over and within the revolving screen. The excavating plow and elevator are so constructed and arranged as not to become clogged by obstructions sometimes encountered. By the employment of a pilot or superficial plow, we eliminate weeds, sods and the like which lessen the intake of the excavating plow.

Figure 1 is a top view of our invention, showing a general arrangement of parts. Fig. 2 is a side sectional elevation of Fig. 1 taken on line *x x* Fig. 1. Fig. 3 is a top view of the excavating plow, showing the flapper or bridging device auxiliary thereto. Fig. 4 is a view of the excavating plow from its rear end. Fig. 5 is a lateral elevation of the excavating plow. Fig. 6 is a sectional view endwise of the cross-bars and inclosing tubes of the elevator. Fig. 7 is a side elevation of the pilot plow and its appendages. Fig. 8 is a top view of the pilot plow.

The excavating plow is bifurcated on its inner cutting edge as shown in Figs. 1 and 3, having the inner edges beveled and bent downward as shown in Fig. 4 in order to run below the potatoes or other vegetables to be dug or harvested. The plow A may be secured to the elevator framing B as shown, or to any other portion of the harvester in such a position forward of the elevator C′ and be capable of being lowered or raised to insure its proper function in the digging—which is accomplished by adjusting mechanism shown in Figs. 1 and 2 at *d*.

To lessen the unnecessary intake of the excavating plow, an auxiliary plow or pilot F, shown in Figs. 7 and 8, is placed forward of the excavating plow and hinged or pivoted at its rear extending arms to the framing of the elevator to permit of a vertical motion. A wide-faced wheel *h*, having adjustable bearings *i* is attached to and forward of the auxiliary plow F, which is to roll upon the surface of the ground as shown in Fig. 7, so as to gage the depth of the pilot plow F. The pilot plow is V-shaped or V-pointed from which blades or mold boards extend backward and obliquely outward beyond the excavating plow shown in dotted lines Fig. 8 at *k*, which is to throw thin or surface furrows beyond the path of the excavating plow A, thus eliminating weeds, sods and other surface obstructions. The pilot plow is so constructed and arranged as to be elevated out of action if desired. The plow A and elevator C′ are rigidly secured to each other yet having the intervening space bridged over by the flapper L as already described.

The flapper L or bridging device is placed between the excavating plow and the elevator C′, and is provided with serrations or projecting fingers *m m* shown in Figs. 1, 2, and 3, extending toward the forward end of elevator C′, leaving a space for the upward movement of the cross-bars of elevating apparatus; the flapper acting as a bridge from plow A to elevator C′ so that the potatoes, onions and the like will not fall to the ground before their passage through the revolving meshed screen N. The flapper is made of steel, and hinged or pivoted at or near its front edge and immediately at rear edge of plow and rests on a stop *o*, and with an intervening space of say an inch or so. This flapper is a very important and necessary device to obviate the clogging of the elevator or conveyer due to stones and other obstructions that may be picked up and lodged between the cross-bars of the elevator; and it also serves as a bridge over which the earth, vegetables, stones and the like are carried or forced back from the plow.

The endless elevator C' is made, within its conveying channel or passage way B B considerably wider than the intake of the plow A so that the earth and sand may be shaken downward from the cross-bars C C from a thinner layer than taken on by the plow A. The cross-bars themselves are unlike others for this purpose, in that they are loosely incased in pieces of tubing between the link belting; the tubes turn upon the cores or cross-bars so as to effectually prevent clogging by the interposition of stones or other obstructions otherwise lodging between the elevator bars in the ordinary form of construction. In Fig. 6 is a sectional view of the cross-bar $p$ with the loosely-incasing tube $r$. The sleeves are rotated through their contact with the members W', on the shaft at the front end of the conveyer as the conveyer travels therearound and by the idlers $W^2$ intermediate the front and rear of the conveyer.

The revolving screen N is in cylindrical form, which may be made by inclosing or encompassing coarse wire cloth or bars of iron $s\ s$ arranged longitudinally to the axis of motion of screen or transversely thereto as shown in Figs. 1 and 2, that is to say, circumferentially, in annular or spiral form within two or more guide rings T T on the outside rings, and is provided with cogs or their equivalents T' to engage corresponding rotating gearing $u$, having its bearings in the framing V of the harvester. Power is applied and communicated by the traction wheels W W which roll on the ground to the revolving meshed screen by gearing or sprockets and chains in any convenient way. The interior of the revolving screen has neither arms nor shafting to obstruct in any way the rapid passage of earth, roots and the like either through the meshes or at rear end of screen.

It is believed much better results will be secured by having the interior screening bars bent or formed to present a helical appearance as shown in Fig. 2, so as to more quickly convey out the constantly-accumulating contents of the screen by spiral contact, and it is obvious that this form of screen is superior to those already described.

The plow, elevator, screen and all other parts are adjustable by any of the well-known agencies such as levers, tangent screws and the like.

What we claim, is—

1. In a vegetable excavating and separating device, traction wheels, a revolving screen, means for revolving the screen, an excavator, a conveyer adapted to receive material from the excavator and deliver said material to the screen, said conveyer having a series of cross bars each incased in a tube, a flexible member on each end thereof, and means for driving the conveyer, members over which the sleeves travel and by which they are rotated.

2. In a vegetable excavating and separating device, traction wheels, a revolving screen, means for revolving said screen, an excavator, a conveyer adapted to receive material from the excavator and deliver said material to the screen, said conveyer having a series of cross bars, each incased in a tube, a flexible member on each end thereof, means for driving the conveyer, members over which the sleeves travel and by which they are rotated, a flapper interposed between the excavator and the conveyer, the said flapper taking motion from the conveyer.

3. In a vegetable excavating and separating device, traction wheels, a revolving screen, means for revolving said screen, an excavator, a conveyer adapted to receive material from the excavator and deliver said material to the screen, said conveyer having a series of cross bars each incased in a tube, a flexible member on each end thereof, means for driving the conveyer, members over which the sleeves travel and by which they are rotated, and a flapper interposed between the excavator and the conveyer, the said flapper taking motion from the conveyer.

4. In a potato digger, a conveyer having flexible members, bars extending between the flexible members, casings on the bars, means for driving the conveyers and means for causing the rotation of the casings.

In testimony whereof we have affixed our signatures, in presence of two witnesses.

WILLIAM J. DUNHAM.
EUGENE W. PECK.

Witnesses:
J. E. BELDEN,
G. W. PECK.